(12) United States Patent
Stringer et al.

(10) Patent No.: US 10,796,863 B2
(45) Date of Patent: Oct. 6, 2020

(54) FABRIC KEYBOARD

(71) Applicant: Apple Inc., Cupertino, CA (US)

(72) Inventors: Christopher J. Stringer, Cupertino, CA (US); Daniel J. Coster, Cupertino, CA (US); Benjamin A. Shaffer, Cupertino, CA (US); Benjamin A. Cousins, Cupertino, CA (US); Melody Kuna, Cupertino, CA (US); Sean S. Corbin, Cupertino, CA (US); John M. Brock, Menlo Park, CA (US); Robert S. Murphy, Sunnyvale, CA (US); Thomas W. Wilson, Jr., Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/826,590

(22) Filed: Aug. 14, 2015

(65) Prior Publication Data

US 2016/0049266 A1 Feb. 18, 2016

Related U.S. Application Data

(60) Provisional application No. 62/037,947, filed on Aug. 15, 2014.

(51) Int. Cl.
*H01H 13/86* (2006.01)
*H01H 13/704* (2006.01)
(Continued)

(52) U.S. Cl.
CPC ......... *H01H 13/704* (2013.01); *G06F 1/1656* (2013.01); *G06F 1/1662* (2013.01);
(Continued)

(58) Field of Classification Search
CPC .. H01H 13/86; H01H 13/83; H01H 2209/016; H01H 2221/006;
(Continued)

(56) References Cited

U.S. PATENT DOCUMENTS

| 3,657,492 A | 4/1972 | Arndt et al. |
| 3,917,917 A | 11/1975 | Murata |

(Continued)

FOREIGN PATENT DOCUMENTS

| CN | 2155620 | 2/1994 |
| CN | 2394309 | 8/2000 |

(Continued)

OTHER PUBLICATIONS

International Search Report and Written Opinion, PCT/US2015/045367, 13 pages, dated Nov. 25, 2015.
(Continued)

*Primary Examiner* — Felix O Figueroa
(74) *Attorney, Agent, or Firm* — Dorsey & Whitney LLP

(57) ABSTRACT

An input device, such as a keyboard, includes one or more keys that each includes a keycap operable to move within an aperture of a frame to activate a switch and fabric disposed over the frame and keycap. A first region of the fabric is bonded to the keycap and a second region of the fabric is bonded to the frame. The first region may be an embossed region and the second region may be an unembossed region. The fabric may dampen sound from within the keyboard, such as noise related to movement of the keycap, activation of the switch, and so on. The fabric may also form a barrier that restricts passage of contaminants into the aperture and/or other portions of the input device.

19 Claims, 11 Drawing Sheets

(51) Int. Cl.
*H01H 13/7065* (2006.01)
*H01H 13/83* (2006.01)
*H01H 13/88* (2006.01)
*G06F 1/16* (2006.01)
*G06F 3/02* (2006.01)

(52) U.S. Cl.
CPC ....... *G06F 3/0202* (2013.01); *H01H 13/7065* (2013.01); *H01H 13/83* (2013.01); *H01H 13/86* (2013.01); *H01H 13/88* (2013.01); *H01H 2219/048* (2013.01); *H01H 2221/058* (2013.01); *H01H 2223/003* (2013.01); *H01H 2223/044* (2013.01)

(58) Field of Classification Search
CPC ....... H01H 2221/002; H01H 2223/003; H01H 2223/044
USPC .......................................... 200/302.2; 400/479
See application file for complete search history.

(56) References Cited

U.S. PATENT DOCUMENTS

| | | | | |
|---|---|---|---|---|
| 3,978,297 A * | | 8/1976 | Lynn | H01H 13/702 200/302.2 |
| 4,095,066 A | | 6/1978 | Harris | |
| 4,319,099 A | | 3/1982 | Asher | |
| 4,349,712 A | | 9/1982 | Michalski | |
| 4,484,042 A | | 11/1984 | Matsui | |
| 4,596,905 A | | 6/1986 | Fowler | |
| 4,598,181 A | | 7/1986 | Selby | |
| 4,670,084 A | | 6/1987 | Durand et al. | |
| 4,755,645 A | | 7/1988 | Naoki et al. | |
| 4,937,408 A | | 6/1990 | Hattori et al. | |
| 4,987,275 A | | 1/1991 | Miller et al. | |
| 5,021,638 A * | | 6/1991 | Nopper | G06F 3/0202 200/302.2 |
| 5,092,459 A * | | 3/1992 | Uljanic | H01H 9/0242 200/302.2 |
| 5,136,131 A | | 8/1992 | Komaki | |
| 5,278,372 A | | 1/1994 | Takagi et al. | |
| 5,280,146 A * | | 1/1994 | Inagaki | B29C 45/1418 200/302.2 |
| 5,340,955 A | | 8/1994 | Calvillo et al. | |
| 5,382,762 A | | 1/1995 | Mochizuki | |
| 5,397,867 A | | 3/1995 | Demeo | |
| 5,408,060 A | | 4/1995 | Muurinen | |
| 5,421,659 A | | 6/1995 | Liang | |
| 5,422,447 A | | 6/1995 | Spence | |
| 5,457,297 A | | 10/1995 | Chen | |
| 5,477,430 A | | 12/1995 | LaRose et al. | |
| 5,481,074 A | | 1/1996 | English | |
| 5,504,283 A | | 4/1996 | Kako et al. | |
| 5,512,719 A | | 4/1996 | Okada et al. | |
| 5,625,532 A | | 4/1997 | Sellers | |
| 5,804,780 A | | 9/1998 | Bartha | |
| 5,828,015 A | | 10/1998 | Coulon | |
| 5,847,337 A | | 12/1998 | Chen | |
| 5,874,700 A | | 2/1999 | Hochgesang | |
| 5,875,013 A | | 2/1999 | Takahara | |
| 5,876,106 A | | 3/1999 | Kordecki et al. | |
| 5,878,872 A | | 3/1999 | Tsai | |
| 5,881,866 A | | 3/1999 | Miyajima et al. | |
| 5,898,147 A | | 4/1999 | Domzaiski et al. | |
| 5,924,555 A | | 7/1999 | Sadamori et al. | |
| 5,935,691 A | | 8/1999 | Tsai | |
| 5,960,942 A | | 10/1999 | Thornton | |
| 5,986,227 A | | 11/1999 | Hon | |
| 6,020,565 A | | 2/2000 | Pan | |
| 6,068,416 A | | 5/2000 | Kumamoto et al. | |
| 6,215,420 B1 | | 4/2001 | Harrison et al. | |
| 6,257,782 B1 | | 7/2001 | Maruyama et al. | |
| 6,259,046 B1 | | 7/2001 | Iwama et al. | |
| 6,377,685 B1 | | 4/2002 | Krishnan | |
| 6,388,219 B2 | | 5/2002 | Hsu et al. | |
| 6,423,918 B1 | | 7/2002 | King et al. | |
| 6,482,032 B1 | | 11/2002 | Szu et al. | |
| 6,530,283 B2 | | 3/2003 | Okada et al. | |
| 6,538,801 B2 | | 3/2003 | Jacobson et al. | |
| 6,542,355 B1 | | 4/2003 | Huang | |
| 6,552,287 B2 | | 4/2003 | Janniere | |
| 6,556,112 B1 | | 4/2003 | Van Zeeland et al. | |
| 6,559,399 B2 | | 5/2003 | Hsu et al. | |
| 6,560,612 B1 | | 5/2003 | Yamada et al. | |
| 6,572,289 B2 | | 6/2003 | Lo et al. | |
| 6,573,463 B2 * | | 6/2003 | Ono | B29C 45/1418 200/302.2 |
| 6,585,435 B2 * | | 7/2003 | Fang | H01H 13/702 400/479 |
| 6,624,369 B2 | | 9/2003 | Ito et al. | |
| 6,706,986 B2 | | 3/2004 | Hsu | |
| 6,738,050 B2 | | 5/2004 | Comiskey | |
| 6,750,414 B2 | | 6/2004 | Sullivan | |
| 6,759,614 B2 | | 7/2004 | Yoneyama | |
| 6,762,381 B2 | | 7/2004 | Kunthady et al. | |
| 6,765,503 B1 | | 7/2004 | Chan et al. | |
| 6,788,450 B2 | | 9/2004 | Kawai et al. | |
| 6,797,906 B2 | | 9/2004 | Ohashi | |
| 6,850,227 B2 | | 2/2005 | Takahashi et al. | |
| 6,860,660 B2 | | 3/2005 | Hochgesang et al. | |
| 6,911,608 B2 | | 6/2005 | Levy | |
| 6,926,418 B2 | | 8/2005 | Ostergård et al. | |
| 6,940,030 B2 | | 9/2005 | Takeda et al. | |
| 6,977,352 B2 | | 12/2005 | Oosawa | |
| 6,979,792 B1 | | 12/2005 | Lai | |
| 6,987,466 B1 | | 1/2006 | Welch et al. | |
| 6,987,503 B2 | | 1/2006 | Inoue | |
| 7,012,206 B2 | | 3/2006 | Oikawa | |
| 7,030,330 B2 | | 4/2006 | Suda | |
| 7,038,832 B2 | | 5/2006 | Kanbe | |
| 7,129,930 B1 | | 10/2006 | Cathey et al. | |
| 7,134,205 B2 | | 11/2006 | Bruennel | |
| 7,146,701 B2 | | 12/2006 | Mahoney et al. | |
| 7,151,236 B2 | | 12/2006 | Ducruet et al. | |
| 7,151,237 B2 | | 12/2006 | Mahoney et al. | |
| 7,154,059 B2 | | 12/2006 | Chou | |
| 7,166,813 B2 | | 1/2007 | Soma | |
| 7,172,303 B2 | | 2/2007 | Shipman et al. | |
| 7,189,932 B2 | | 3/2007 | Kim | |
| 7,256,766 B2 | | 8/2007 | Albert et al. | |
| 7,283,119 B2 | | 10/2007 | Kishi | |
| 7,301,113 B2 | | 11/2007 | Nishimura et al. | |
| 7,312,790 B2 | | 12/2007 | Sato et al. | |
| 7,378,607 B2 | | 5/2008 | Koyano et al. | |
| 7,385,806 B2 | | 6/2008 | Liao | |
| 7,391,555 B2 | | 6/2008 | Albert et al. | |
| 7,414,213 B2 | | 8/2008 | Hwang | |
| 7,429,707 B2 | | 9/2008 | Yanai et al. | |
| 7,432,460 B2 | | 10/2008 | Clegg | |
| 7,510,342 B2 | | 3/2009 | Lane et al. | |
| 7,531,764 B1 | | 5/2009 | Lev et al. | |
| 7,541,554 B2 | | 6/2009 | Hou | |
| 7,589,292 B2 | | 9/2009 | Jung et al. | |
| 7,639,187 B2 | | 12/2009 | Caballero et al. | |
| 7,639,571 B2 | | 12/2009 | Ishii et al. | |
| 7,651,231 B2 | | 1/2010 | Chou et al. | |
| 7,679,010 B2 | | 3/2010 | Wingett | |
| 7,724,415 B2 | | 5/2010 | Yamaguchi | |
| 7,781,690 B2 | | 8/2010 | Ishii | |
| 7,813,774 B2 | | 10/2010 | Perez-Noguera | |
| 7,842,895 B2 | | 11/2010 | Lee | |
| 7,847,204 B2 | | 12/2010 | Tsai | |
| 7,851,819 B2 | | 12/2010 | Shi | |
| 7,866,866 B2 | | 1/2011 | Wahlstrom | |
| 7,893,376 B2 | | 2/2011 | Chen | |
| 7,923,653 B2 * | | 4/2011 | Ohsumi | H01H 13/88 200/512 |
| 7,947,915 B2 | | 5/2011 | Lee et al. | |
| 7,999,748 B2 | | 8/2011 | Ligtenberg et al. | |
| 8,063,325 B2 | | 11/2011 | Sung et al. | |
| 8,077,096 B2 | | 12/2011 | Chiang et al. | |
| 8,080,744 B2 | | 12/2011 | Yeh et al. | |
| 8,098,228 B2 | | 1/2012 | Shimodaira et al. | |

(56) References Cited

U.S. PATENT DOCUMENTS

| | | |
|---|---|---|
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,111,700 B2 * | 8/2015 | Liu .................. H01H 13/52 |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,443,672 B2 | 9/2016 | Martisauskas |
| 9,448,628 B2 | 9/2016 | Tan et al. |
| 9,471,185 B2 | 10/2016 | Guard |
| 9,477,382 B2 | 10/2016 | Hicks et al. |
| 9,612,674 B2 | 4/2017 | Degner et al. |
| 9,734,965 B2 | 8/2017 | Martinez et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2004/0257247 A1 | 12/2004 | Lin et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2011/0303521 A1 | 12/2011 | Niu et al. |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0116865 A1 | 5/2014 | Leong et al. |
| 2014/0118264 A1 | 5/2014 | Leong et al. |
| 2014/0151211 A1 | 6/2014 | Zhang |
| 2014/0184496 A1 | 7/2014 | Gribetz et al. |
| 2014/0191973 A1 | 7/2014 | Zellers et al. |

(56) References Cited

U.S. PATENT DOCUMENTS

| | | | |
|---|---|---|---|
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0320436 A1 | 10/2014 | Modarres et al. |
| 2014/0346025 A1 | 11/2014 | Hendren et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0090570 A1 | 4/2015 | Kwan et al. |
| 2015/0090571 A1 | 4/2015 | Leong et al. |
| 2015/0227207 A1 | 8/2015 | Winter et al. |
| 2015/0243457 A1 | 8/2015 | Niu et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1* | 10/2015 | Zhang .......... G06F 1/1684 |
| | | | 361/679.16 |
| 2015/0332874 A1 | 11/2015 | Brock et al. |
| 2015/0348726 A1 | 12/2015 | Hendren |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0011869 A1 | 1/2017 | Knopf et al. |
| 2017/0090106 A1 | 3/2017 | Cao et al. |
| 2017/0301487 A1 | 10/2017 | Leong et al. |
| 2017/0315624 A1 | 11/2017 | Leong et al. |
| 2018/0029339 A1 | 2/2018 | Liu et al. |
| 2018/0040441 A1 | 2/2018 | Wu et al. |
| 2018/0074694 A1 | 3/2018 | Lehmann et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2022606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |

(56) References Cited

FOREIGN PATENT DOCUMENTS

| | | |
|---|---|---|
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

Elekson, "Reliable and Tested Wearable Electronics Embedment Solutions," http://www.wearable.technology/our-technologies, 3 pages, at least as early as Jan. 6, 2016.
U.S. Appl. No. 14/472,260, filed Aug. 28, 2014, pending.
U.S. Appl. No. 14/501,680, filed Sep. 30, 2014, pending.
U.S. Appl. No. 14/736,151, filed Jun. 10, 2015, pending.
U.S. Appl. No. 14/765,145, filed Jul. 31, 2015, pending.
U.S. Appl. No. 14/867,598, filed Sep. 28, 2015, pending.
U.S. Appl. No. 14/867,672, filed Sep. 28, 2015, pending.
U.S. Appl. No. 14/867,712, filed Sep. 28, 2015, pending.
U.S. Appl. No. 14/867,746, filed Sep. 28, 2015, pending.
U.S. Appl. No. 15/014,596, filed Feb. 3, 2016, pending.
U.S. Appl. No. 15/154,682, filed May 13, 2016, pending.
U.S. Appl. No. 15/154,706, filed May 13, 2016, pending.
U.S. Appl. No. 15/154,723, filed May 13, 2016, pending.
U.S. Appl. No. 15/154,768, filed May 13, 2016, pending.
U.S. Appl. No. 15/230,740, filed Aug. 8, 2016, pending.
U.S. Appl. No. 15/230,724, filed Aug. 8, 2016, pending.
U.S. Appl. No. 15/261,954, filed Sep. 11, 2016, pending.
U.S. Appl. No. 15/261,972, filed Sep. 11, 2016, pending.
U.S. Appl. No. 152/62,249, filed Sep. 12, 2016, pending.
U.S. Appl. No. 15/264,827, filed Sep. 14, 2016, pending.
U.S. Appl. No. 15/268,518, filed Sep. 16, 2016, pending.
U.S. Appl. No. 15/269,790, filed Sep. 19, 2016, pending.

* cited by examiner

FABRIC KEYBOARD

CROSS-REFERENCE TO RELATED APPLICATION

This application is a nonprovisional patent application of and claims the benefit of U.S. Provisional Patent Application No. 62/037,947, filed Aug. 15, 2014 and titled "Fabric Keyboard," the disclosure of which is hereby incorporated herein by reference in its entirety.

FIELD

This disclosure relates generally to input devices, and more specifically to keyboards having a fabric component.

BACKGROUND

Many electronic devices utilize input devices to receive commands or other interactions from users. In some cases, such input devices may also provide output to that may or may not be associated with received inputs. One common, widely-used input device is a keyboard.

Keyboards may include one or more keys, each of which may have a legend or legends thereon that indicate the input provided when the key is pressed. Sample legends are one or more letters, numbers, signs, symbols, or other characters.

In various cases, mechanisms that allow the keys to move may produce noise. Such mechanisms may require a particular amount of force to move sufficiently to provide an input, and may provide a particular tactile feel when pressed. These components and/or other components of the keys may be vulnerable to entry of contaminants such as dust, food, other particles, water, and/or other liquids, since each key's keycap typically protrudes upward through a plate or case, thereby permitting entry of foreign matter around the edges of the keycaps.

SUMMARY

The present disclosure describes systems, apparatuses, and methods related to fabric input devices such as fabric keyboards. An input device including keys that move within apertures of a frame may be covered by a fabric bonded to the keys and frame. The fabric may dampen sound from within the input device and form a barrier that restricts passage of contaminants. In various implementations, the fabric may include embossed areas or structures bonded to tops of keycaps of the keys and unembossed areas bonded to the frame. Sides of the keycaps may not be bonded to the embossed areas such that unbonded portions of the fabric are able to bend and/or buckle during keycap movement. In some implementations, the fabric and/or flanges of the keycaps and/or the frame around the apertures may restrict movement of the keycaps in various directions.

In various embodiments, an input device may include a frame with an aperture, a keycap at least partially within the aperture and operable to move with respect to the frame, a switch positioned under the keycap that is activated by vertical movement of the keycap with respect to the switch, and a fabric disposed over the frame and keycap with a first region bonded to the keycap and a second region bonded to the frame.

In some embodiments, a keyboard may include a fabric having embossed regions with rounded corners and an unembossed region, a frame with apertures, and keys. Each key may include a top hat configuration keycap operable to move within one of the apertures and a switch positioned under the top hat configuration keycap that is activated by vertical movement of the top hat configuration keycap with respect to the switch. A planar upper or top surface of the top hat configuration keycap of each key may be bonded to one of the embossed regions and the frame may be bonded to the unembossed region.

In one or more embodiments, a method for manufacturing an input device may include: embossing a fabric to create embossed structures and an unembossed area; bonding a frame to one of the unembossed area using a first adhesive, the frame including an aperture; and bonding a top of a keycap of a key to one of the embossed structures using a second adhesive, leaving sides of the keycap unbonded, wherein the key includes the frame, the keycap positioned at least partially within the aperture, and a switch positioned under the keycap that is activated by vertical movement of the keycap with respect to the switch.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
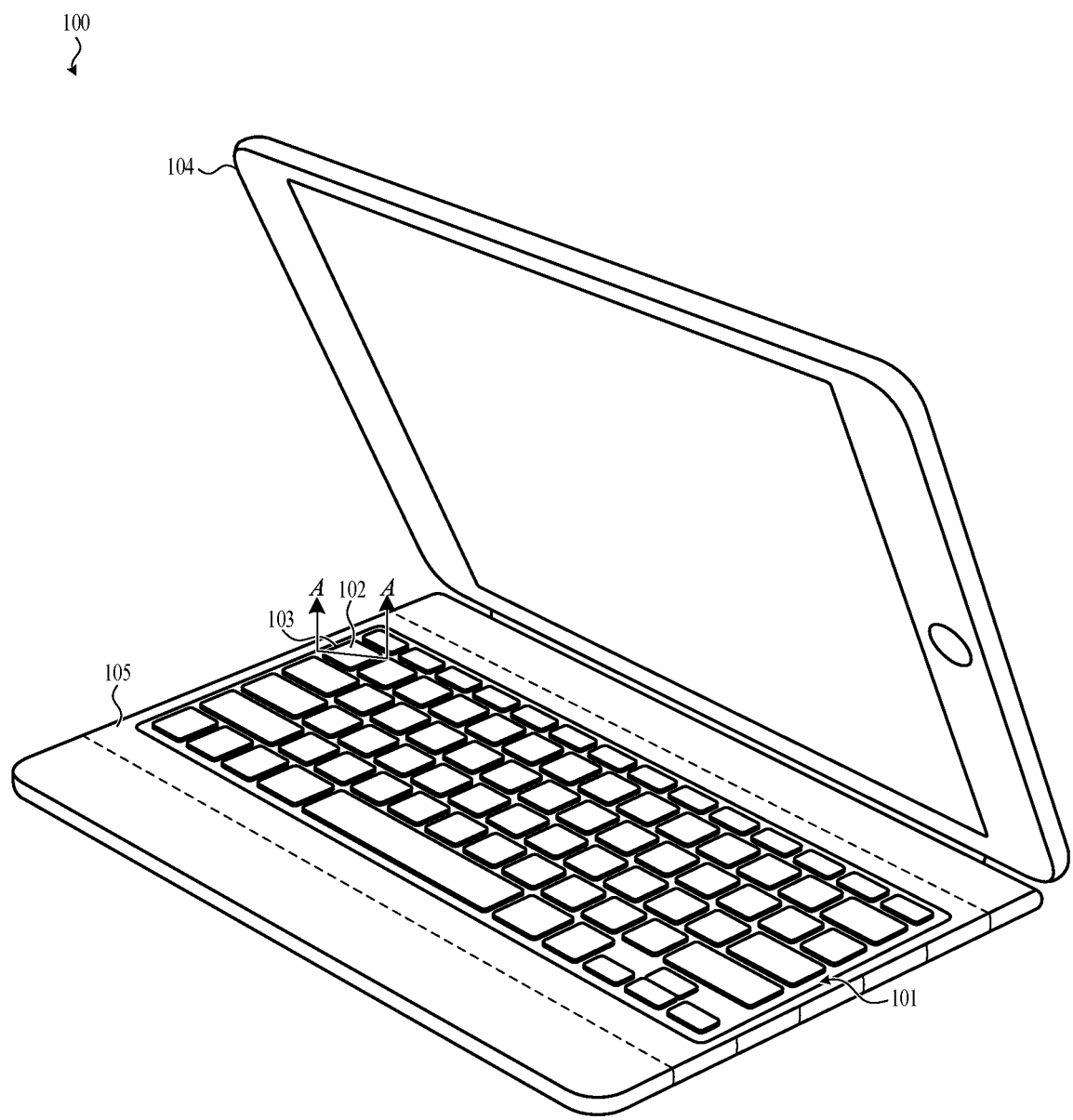
FIG. 1 depicts a sample system including an example fabric keyboard.

The description that follows includes sample systems, methods, and apparatuses that embody various elements of the present disclosure. However, it should be understood that the described disclosure may be practiced in a variety of forms in addition to those described herein.

The present disclosure describes systems, apparatuses, and methods related to fabric input devices, such as fabric keyboards, that are suitable for use with various electronic devices. An input device may include a frame, multiple keys that generate inputs when pressed, and fabric (or multiple layers of fabric) overlying the keycaps and, optionally, some portion of the frame. Each key may further include a keycap that is operable to move within an aperture of the frame, a switch (such as a dome switch) activated when the keycap depresses sufficiently far, and a support mechanism that biases the key away from the switch in its resting state, but collapses or otherwise contracts when the keycap is pressed so that the keycap may actuate the switch.

Part of the fabric may be bonded to the keycap and a second part of the fabric may be bonded to the frame. Generally, the portion of the fabric bonded to the keycap is raised above, and forms a raised feature with respect to, the portion of the fabric that is bonded to the frame. This may be referred to herein as an "embossed" feature, area, or the like. The use of the term "embossed" does not imply or require any particular method for forming a corresponding feature or area. Rather, an embossed area, feature or the like may be formed by any suitable process or mechanism, including heat forming, molding, stamping, crimping, weaving, or the like. Some embossed areas or structures discussed herein have one or more sidewalls connecting the raised region to the lower region; such sidewalls may be generally perpendicular to one of or both the raised and lower regions, although this is not necessary.

The fabric may be slack, or excess fabric may be contained, between the part bonded to the keycap and the part bonded to the frame. The fabric may be sufficiently slack that it does not pull on the keycap or otherwise exert force on the keycap either while the keycap is in a rest state or during the keycap's travel.

The fabric may dampen sound from within the keyboard, such as noise related to movement of the keycap, activation of the switch, and so on. The fabric may also form a barrier that restricts passage of contaminants (such as dust, food, or other particles and/or water and/or other liquids) into the aperture and/or other portions of the input device. Put another way, a top section of fabric may be bonded to the keycap and side sections of fabric (e.g., that portion of fabric overlapping the sides of the keycap or otherwise extending from the top section) may be unbonded, such that the side sections are operable to bend and/or buckle during movement of the keycap. Thus, the fabric is not in tension during the movement, but instead is slack. In some cases, the height of the side sections and thus the height of the embossed area may be related to the travel distance of the keycap such that higher embossed area heights may be configured for keycaps with longer travel distances.

In some implementations, the keys or keycaps may utilize a "top hat configuration." A "top hat" key may have a keycap with a typically planar upper (or top) surface and side walls extending downwardly from the upper surface. The keycap may further define one or more flanges that extend outwardly from the side walls; in some embodiments, a continuous annular ring or plate structure may be used instead of one or more flanges. Such a configuration may be referred to as a "top hat" because the keycap shape and/or profile resembles a simplified top hat.

The keycap may be biased upward by the switch, or otherwise supported by the switch, when force is not exerted downward upon the keycap. The frame may include flanges or other features that are operable to interact with flanges of the keycap to restrict upward movement of the keycap so that the keycap does not exit the aperture. The flanges of the keycap may also interact with the aperture or another feature of the frame to restrict lateral movement of the keycap. The keycap may include a top surface that projects above the aperture when force is not exerted downward upon the keycap and is flush with the aperture and/or enters the aperture when force is exerted downward. The region of the fabric bonded to the keycap may be bonded to the top surface of the keycap. In such implementations, the fabric may further restrict lateral movement and/or other movement of the keycap.

The fabric may be embossed to include one or more embossed areas or embossed structures and one or more embossed areas. In such a case, the region of the fabric bonded to the keycap may be an embossed area. In various implementations, the embossed area may include a top section and side sections positioned perpendicular to the top section.

In various implementations, fabric of various characteristics may be selected based on interaction with the switch and/or other such factors. For example, the material composing the fabric (such as nylon, elastane, polyester, and/or other such material) may be selected such that a force curve involved in activating the switch is not significantly altered and/or to deliberately alter the force curve involved in activating the switch. By way of another example, in cases where the fabric includes an embossed area formed into a shape with one or more rounded corners, the radius of the curved corner may be selected to not significantly alter the force curve and/or to deliberately alter the force curve involved in activating the switch. The smaller the radius of curved corners may cause the embossed area to have more self-supporting stiffness and thus increasingly affect the force curve, whereas the larger the radius, the less self-supporting stiffness and less effect to the force curve. Alternately, the keycap may have non-rounded, pointed corners which may have even more self-supporting stiffness and thus affect the force curve more than rounded corners.

In some implementations, the keys may include one or more illuminators. For example, one or more illuminators (such as one or more light emitting diodes or "LEDs") may be positioned under the keycap, on the keycap, and so on. In such cases, the fabric, keycap, and/or other components may be configured such that the illuminator is operable to illuminate the key, a legend (such as a letter, number, symbol, glyph, and/or other pattern) on a surface of the key, and so on. For example, the fabric may be permeable to light but the keycap may not be such that light from an illuminator positioned under the keycap is operable to shine around the keycap and out of the fabric to illuminate an area around the key. By way of another example, a portion of the fabric corresponding to a legend on a surface of the keycap may be permeable to light whereas other portions of the fabric are not (such as where the fabric includes a light permeable layer covered by a non-light permeable layer such as paint or fabric where the area of the non-light permeable layer corresponding to the legend removed by laser etching or other process, the fabric includes a non-light permeable material with a light permeable and/or light transmissive material woven and/or otherwise positioned in the area of the legend, and so on) such that an illuminator positioned under the fabric is operable to illuminate the legend.

Although the present disclosure is illustrated and described in the context of a fabric keyboard, it is understood that this is an example. In various implementations, the techniques of the present disclosure may be utilized in various other fabric input devices (such as a fabric covered button) without departing from the scope of the present disclosure.

FIG. 1 shows a sample system 100 including an example fabric keyboard 101, such as the fabric keyboard generally discussed above and described in more detail below. As illustrated, the system 100 includes an electronic device 104 and a cover 105 that includes or otherwise incorporates a fabric keyboard 101 and is configured to removably attach to the electronic device 104.

As further illustrated in FIG. 1, the fabric keyboard 101 may include one or more keys 102. Each key 102 is covered by a fabric 106. As previously discussed, the fabric 106 may be a single piece of material or may be formed from multiple pieces of material. Further, the fabric 106 may be bonded to each key 102 (or more particularly, a keycap of each key) and to the cover 105 in order to form a barrier against ingress of foreign material. A sample structure of an individual key 102 and fabric 106, including the interaction between the two and their related structural configuration, is discussed in more detail below with respect to FIGS. 2-3.

In some implementations the keys 102 may include one or more rounded corners, each having a radius 103. The radius 103 may affect the stiffness of the fabric at the respective area of the fabric keyboard 101. Rounded corners with a smaller radius 103 (or non-rounded corners) may result in stiffer fabric portions whereas rounded corners with a larger radius 103 may result in less stiff fabric portions.

Figure 2:
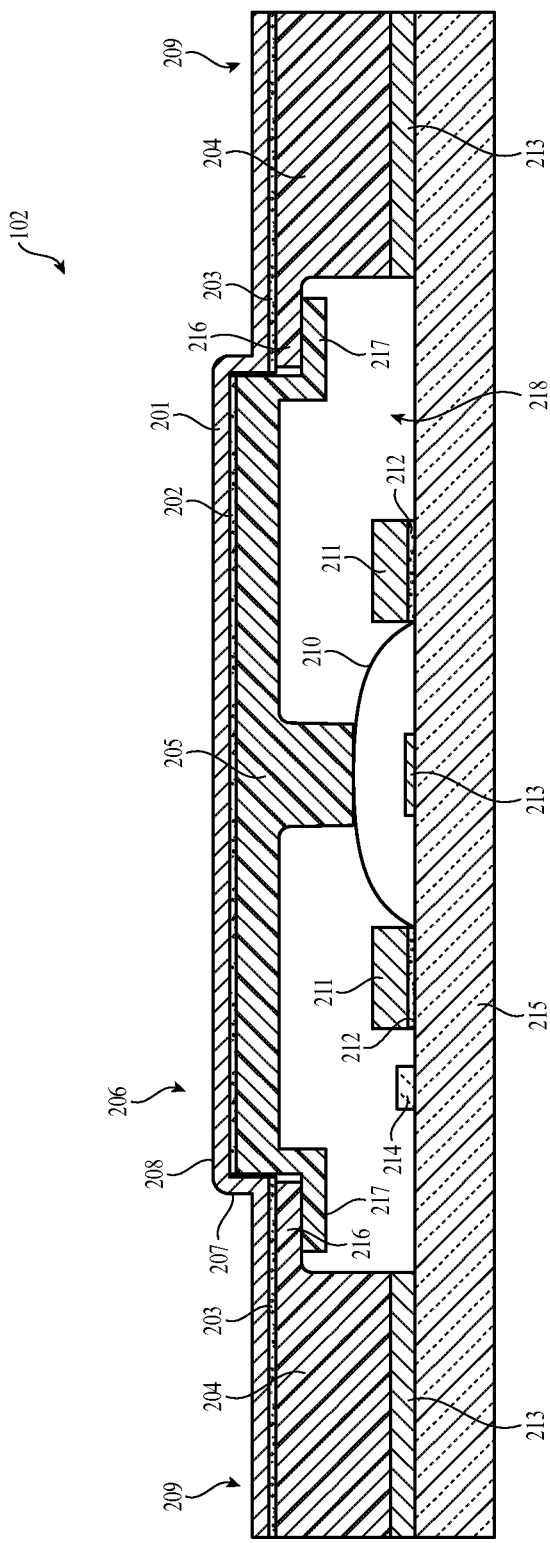
FIG. 2 is a cross-sectional view of a key of the fabric keyboard of FIG. 1, taken along diagonal line A-A of FIG. 1.

FIG. 2 is a cross-sectional view of a key 102 of the fabric keyboard 101 of FIG. 1, taken along diagonal line A-A of FIG. 1. As illustrated, a fabric 201 may be bonded (such as by adhesive 202) to the top surface of a keycap 205 and to a frame 204 (such as by adhesive 203). The frame 204 may define an aperture 218 in or through which the keycap 205 may move. Movement of the keycap 205 (illustrated as vertical movement) may activate a dome switch by deforming a dome 210 to touch or otherwise connect to a contact 213. The dome 210 and contact 213 may be positioned on a substrate 215 such as a printed circuit board (PCB).

The dome 210 may be held in place on the substrate 215 by a switch block 211 that may be bonded to the substrate 215 (such as by adhesive 212). The switch block 211 may hold the dome 210 in place by providing a barrier that prevents movement of the dome 210. As illustrated, the switch block 211 may prevent lateral motion of the dome 210. In some implementations, the switch block 211 may perform other functions, such as implementations where the switch block 211 operates as and/or includes a light guide.

In some implementations, the key 102 may include one or more illuminators 214, such as one or more LEDs. Although FIG. 2 illustrates the illuminator 214 as positioned below the keycap 205, it is understood that this is an example. In various implementations such an illuminator 214 may be otherwise positioned, such as positioned on top of the keycap 205 and/or integrated into the keycap 205. In some implementations, an illuminator 214 may be offset from the key 102 so that the illuminator 214 illuminates into the key 102. In such an implementation, a light guide may reorient light received by the illuminator 214.

In various implementations, the substrate 215 may be rigid. However, in other implementations the substrate 215 may be flexible such that the fabric keyboard 101 of FIG. 1 and/or other such keyboard including a key such as the key 102 may be flexible. This may enable the fabric keyboard 101 to be folded, bent, rolled up, and/or otherwise manipulated.

In some embodiments, the substrate 215 may be formed into substantially rigid sections or regions, each of which may be associated with a number of keys 102. As one example, each row of the fabric keyboard 101 may be placed atop or otherwise associated with its own substantially rigid section. These substantially rigid sections may be connected by one or more flexible links (such as links made of rubber, elastomer, and/or other flexible material). In such embodiments, though one or more portions of the fabric keyboard 101 may be rigid, the flexible links connecting such rigid portions may enable the fabric keyboard 101 to be folded, bent, rolled up (such as is shown in FIG. 1B), and/or otherwise manipulated in various ways. For example, each row (or a group of rows) of the fabric keyboard 101 may have a rigid substrate but the rows may be connected to each other by one or more flexible links. This configuration may provide stability for users attempting to type on the fabric keyboard 101 while still enabling the fabric keyboard 101 to be rolled up, flexed, and/or otherwise manipulated along axes provided by the flexible links. The fabric keyboard 101 may also be used when rolled to prop the electronic device 104 on a surface at an angle. Additionally or alternatively, the flexible links may extend across one or more columns of the fabric keyboard 101 enabling the fabric keyboard 101 to flex in more than one direction.

Still with respect to FIG. 2, the fabric 201 may be embossed to include one or more embossed regions (or embossed structures) 206 and one or more unembossed regions 209. At least a part of the embossed region 206 may be bonded to the keycap 205 and the unembossed region 209 may be bonded to the frame 204. As further illustrated, the embossed region 206 may include a top section 208 and side sections 207 that are perpendicular to the top section 208. The top section 208 may be bonded to the top surface of the keycap 205 and the side sections 207 may be unbonded such that the side sections 207 are able to buckle and/or bend during movement of the keycap 205. In some cases, the bonded area is less than the total area of either the top of the keycap 205 or the top section 208 of the embossed region 206. This may ensure unrestricted movement of the side sections 207 and prevent the fabric 201 from being in substantial tension during movement of the keycap 205.

Figure 11:
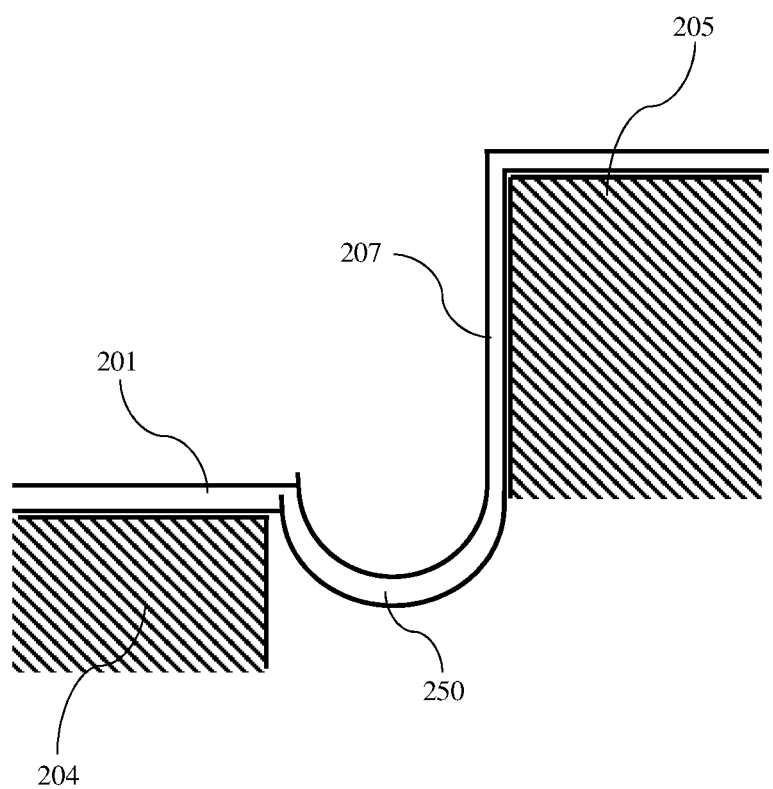
FIG. 11 is a simplified diagram of a fabric having a side section extending downward beneath a frame before extending upward along the side of the keycap.

The height of the side sections 207 may be related to the distance that the keycap 205 travels to deform the dome 210. For example, the embossed region 206 may be over embossed such that the side sections 207 are able to buckle and/or bend during travel of the keycap 205 and not require the fabric 201 to stretch in order to allow such movement, and also to prevent the fabric from exerting force on the keycap. Higher side sections 207 may be configured for keycaps 205 with longer travel distances. Likewise, the side sections 207 may extend downward beneath the frame 204 before extending upward along the side of the keycap 205, thereby forming a U-shaped depression 250 around some or all of a key. This depression may permit the keycap to travel without stretching the fabric or exerting force on the keycap 205. See FIG. 11.

By utilizing the embossed region 206 to allow for keycap 205 travel, stress upon the dome switch of the key 102 may be avoided because the embossed region 206 may prevent stretching of the fabric 201 from exerting unwanted force on the keycap 205. In particular, the side sections 207 may prevent the fabric 201 from exerting unwanted force on the keycap 205 or exerting force on the dome switch.

The keycap 205 may be biased upward or otherwise supported by the dome 210 portion of the switch when force is not exerted downward upon the keycap 205. The top surface of the keycap 205 may project above the aperture 218 when the keycap 205 is not subjected to any external force (e.g., is in a rest state) but may be flush with the aperture 218 and/or enter the aperture 218 when an external force is exerted downward on the keycap 205. In some embodiments, the fabric 201 may also bias (or assist in biasing) the keycap 205 upward. That is, the relative stiffness of the fabric 201 and/or the amount of fabric used in the side section 207 may essentially pull the keycap to its rest state.

Figure 3:
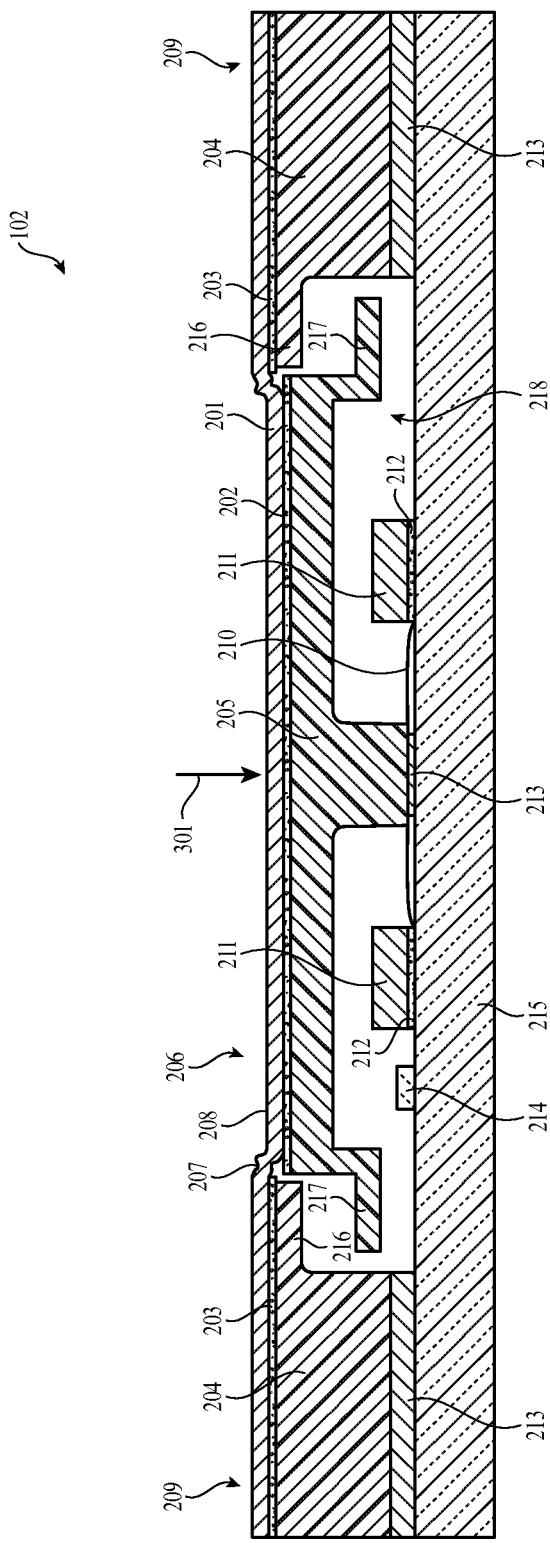
FIG. 3 illustrates the key of FIG. 2 during a center press.

As also illustrated, the keys 102 may take, or have in cross-section, a top hat configuration. Such a top hat configuration may enable the keys 102 to be activated by center presses, side presses, and so on as the top hat configuration may restrict motion of the keycap 205 during a side press such that the keycap 205 deforms the dome 210 (illustrated in FIG. 4) the same as during a center press (as illustrated in FIG. 3 and discussed below). The top hat configuration may include a flange or protrusion 217 that extends from all portions of the keycap sidewalls, or a series of separate flanges/protrusions 217 that each extend from a different portion of the keycap sidewalls.

Further, portions of the frame 204 defining a perimeter around the aperture 218 may include flanges 216 that extend into the aperture 218. The flanges 216 may be operable to contact and block movement of the flanges 217 of the keycap 205 to restrict upward movement of the keycap 205 so that the keycap 205 does not exit the aperture 218. The flanges 217 of the keycap 205 may also contact the perimeter of the frame 204 around the aperture 218, blocking further movement of the flanges 217, to restrict lateral movement of the keycap 205. The fabric 201 may also restrict lateral movement and/or other movement of the keycap 205.

As illustrated, the fabric 201 may cover the aperture 218. In some cases, the fabric 201 may function to dampen sound from within the keyboard and/or emanating through the aperture 218 and/or other components of the key 102, such as noise produced during movement of the keycap 205. In various cases, the fabric 201 may also form a barrier that may restrict passage of contaminants into the aperture, such as dust, food, or other particles and/or water and/or other liquids. This may protect components such as the dome 210 or the contact 213 from corrosion and/or other damage and/or prevent such contaminants from otherwise interfering with operation of the key 102.

Returning again to FIG. 2, although the key 102 is illustrated and described above as having a top surface formed of the fabric 201, it is understood that this is an example. In some implementations, an element such as a key pad may be placed over the fabric 201. This may provide the appearance of a typical keyboard key while still enabling the use of the fabric 201 for purposes of key 102 operations, sound dampening, contaminant barrier, and so on.

Further, although the key 102 is illustrated and described as directly engaging the keycap 205 and the dome switch, it is understood that this is an example. In various implementations one or more other mechanisms may positioned between the keycap 205 and the dome switch (which may be a switch other than a dome switch) without departing from the scope of the present disclosure. For example, in such implementations the key 102 may include one or more movement mechanisms such as a butterfly mechanism, a scissor mechanism, and/or any other such key movement mechanism. These movement mechanisms may limit the upward and/or downward motion and position of the keycap or key, as well as biasing the key or keycap away from the dome switch (or otherwise toward a surface of the input device) when the key is not under a load. In other embodiments, one or both of the dome switch and fabric may serve to similarly limit keycap/key motion and bias the keycap/key.

Additionally, although the fabric 201 is illustrated and described above as being embossed and not being in tension during movement of the keycap 205, it is understood that this is an example. In various implementations, the fabric 201 may be formed of an elastic material without embossed areas 206 and that stretches to allow movement of the keycap 205, which may stretch in the absence of force applied to the keycap 205 to allow the keycap 205 to project above the frame 204. In some such implementations a material may be used for the fabric 201 such that stretching of the fabric 201 does not cause the keycap 205 to put excessive stress on the dome 210, such as the stretching of the fabric 201 putting stress in excess of that necessary to deform the dome 210 when force is not exerted on the keycap 205 thus causing unintentional activation and/or improper operation of the key 102.

Still with respect to FIG. 2, as discussed above the key 102 may include one or more illuminators 214. In such cases, the fabric 201, keycap 205, and/or other components may be configured such that the illuminator 214 is operable to illuminate the key 102, a legend (such as a letter, number, symbol, glyph, and/or other pattern) on a surface of the key 102, and so on.

For example, the fabric 201 may be permeable to light (such as being formed of clear and/or translucent nylon) but the keycap 205 may not be. As such, light from the illuminator 214 positioned under the keycap 205 may be operable to shine around the keycap 205 and out of the fabric 201 to illuminate an area around the key 102.

By way of another example, a portion of the fabric 201 corresponding to a legend on a surface of the key 102 may be permeable to light whereas other portions of the fabric 201 are not such that the illuminator 214 positioned under the fabric 201 is operable to illuminate the legend. In some example cases, the fabric 201 may include a light permeable layer (such as clear and/or translucent polyester) covered by a non-light permeable layer (such as opaque paint or polyester) where the area of the non-light permeable layer corresponding to the legend removed by laser etching or other process. In other example cases, the fabric 201 may include a non-light permeable material (such as opaque nylon) with a light permeable (such as clear polyester) and/or light transmissive material (such as fiber optic material) woven and/or otherwise positioned in the area of the legend.

In various implementations, use of an illuminator 214 to backlight the key 102 may result in a "hotspot," or a brighter area of illumination of the surface of the key 102 corresponding to the location of the illuminator 214 surrounded by a dimmer area of illumination corresponding to the area around the illuminator 214. To mitigate the occurrence of such a hotspot by using the illuminator 214 to backlight the key 102, a cover may be positioned over the illuminator 214 between the illuminator 214 and the keycap 205. Such a cover may cause light emitted by the illuminator 214 to diffuse evenly throughout the aperture 218 as opposed to directly toward the keycap 205, resulting in uniform illumination through the surface of the key 102 without a hotspot. In such implementations, the frame 204 may be formed of an opaque material so light emitted by the illuminator 214 of the key 102 is prevented from entering adjacent keys 102.

In some implementations, such a cover or "roof" may extend from a portion of the switch block 211 proximate to the illuminator 214 to fully or partially cover the illuminator 214. In some embodiments of such an implementation, the switch block 211 may include a light guide panel or similar structure that receives light from the illuminator 214 and diffuses the received light more uniformly throughout the aperture 218. For example, the illuminator 214 may be a side-firing LED that emits light toward the light guide panel included in the switch block 211 which is then diffused throughout the aperture 218 by the light guide panel.

FIG. 3 illustrates the key 102 of FIG. 2 during a center press. As illustrated, an external force 301 exerted on the embossed region 206 may move the entire keycap 205 such that the center of the keycap 205 deforms the dome 210 to connect with the contact 213. During such movement, the side sections 207 may buckle and/or bend to allow such movement without causing the fabric 201 to stretch and/or putting the fabric 201 in tension.

Figure 4:
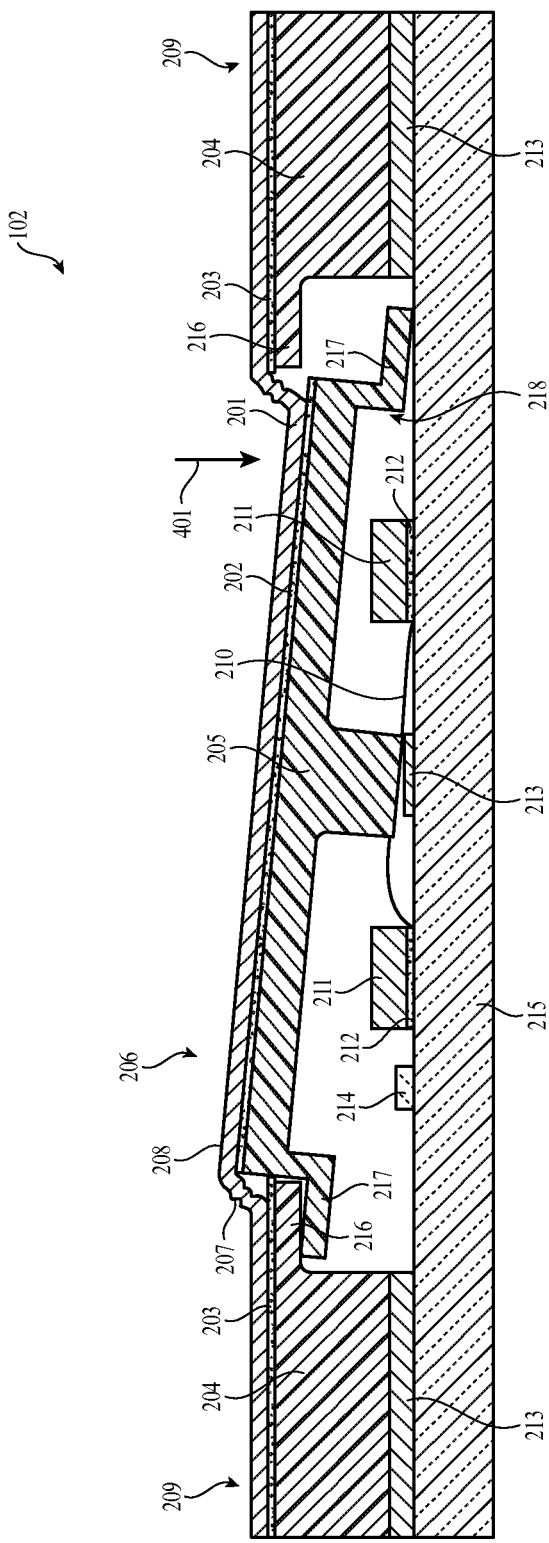
FIG. 4 illustrates the key of FIG. 2 during a side press.

FIG. 4 illustrates the key 102 of FIG. 2 during a side press. As illustrated, an external force 401 exerted on a right side the embossed region 206 may push the right side of the keycap 205 such that the center of the keycap 205 deforms the dome 210 to connect with the contact 213. During such movement, the side sections 207 may buckle and/or bend to allow such movement without causing the fabric 201 to stretch and/or putting the fabric 201 in tension. Also during such movement, the flanges 217 may contact and be blocked by the perimeter of the frame 204 around the aperture 218, the flanges 216, the substrate 215, and/or other structures due to rotation or pivoting of the keycap, which may still cause deformation of the dome 210 despite being pressed on a side instead of the center.

Figure 5:
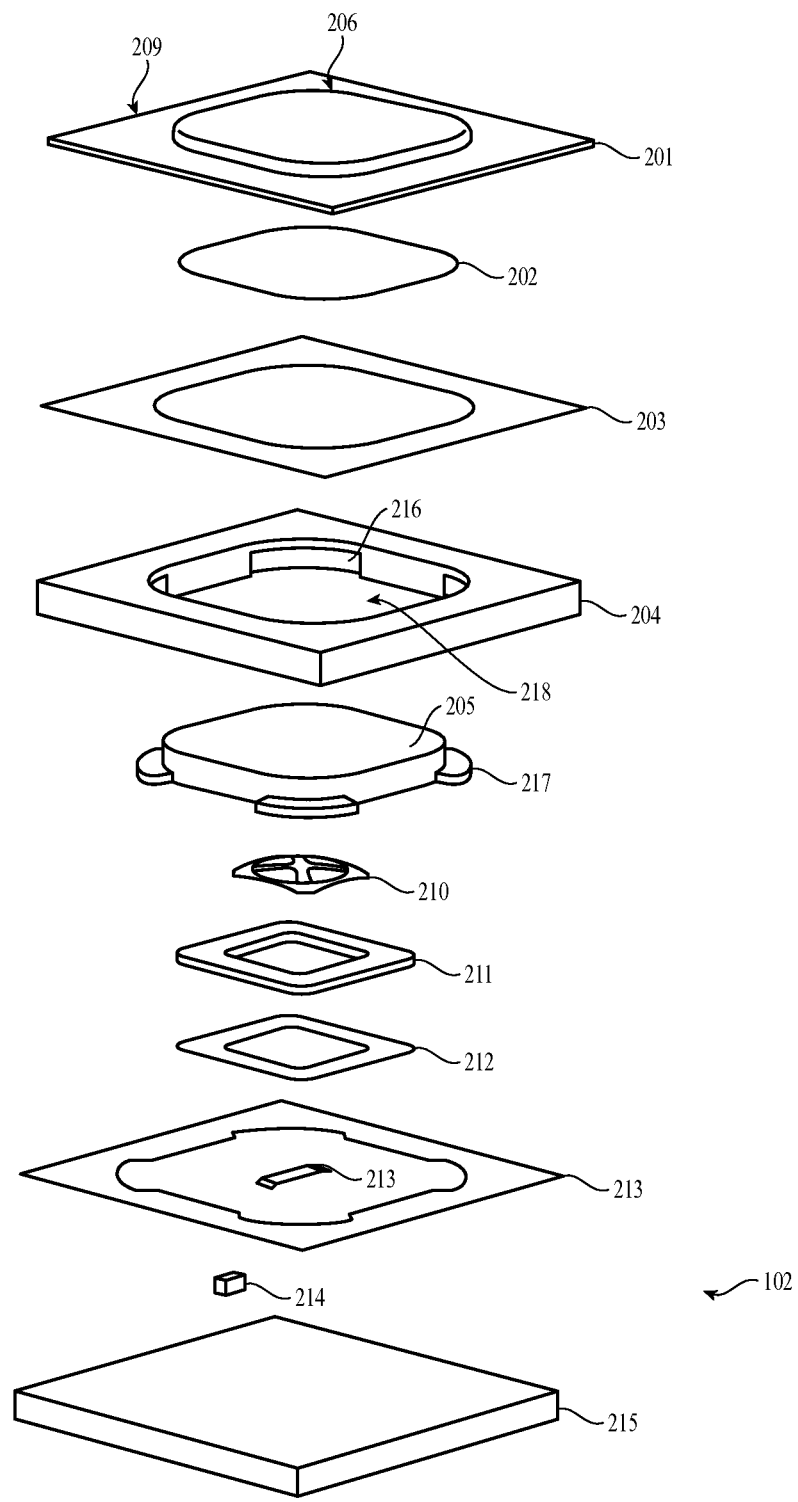
FIG. 5 is an exploded view of the key of the fabric keyboard of FIG. 1.

FIG. 5 is an exploded view of the key 102 of the fabric keyboard 101 of FIG. 1. As illustrated, the contact 213 (and in some implementations the illuminator 214) may be positioned on the substrate 215. The dome 210 may be placed on the substrate 215 and held in place by adhering the switch block 211 to the substrate 215 with the adhesive 212. The keycap 205 may be positioned under the frame 204 in the aperture 218, biased against the frame by the dome 210, and the frame 204 may be coupled to the substrate 215. Then, the unembossed region 209 of the fabric 201 may be bonded to the frame 204 by the adhesive 203 and the embossed region 206 of the fabric 201 may be bonded to the top surface of the keycap 205 by the adhesive 202.

Although a particular order of assembly is discussed above with respect to FIG. 5, it is understood that this is an example. In various implementations, the above discussed components and/or other components may be differently assembled and/or assembled in different orders without departing from the scope of the present disclosure.

In various implementations, fabric 201 of various characteristics may be selected based on interaction with the dome 210 and/or other such factors. For example, the material composing the fabric 201 (such as nylon, elastane, polyester, and/or other such material) may be selected such that a force curve involved in deforming the dome 210 is not significantly altered and/or to deliberately alter the force curve involved in deforming the dome 210.

In some implementations, keys 102 may be configured to require a particular force curve in order to have a pleasing "feel" when operated by a user. If the dome 210 itself is configured with the appropriate force curve and if the fabric 201 significantly changes that force curve, the key 102 may no longer have the pleasing feel. As such, where the dome 210 is already configured with the appropriate force curve, the fabric 201 and/or the embossed region 206 may be configured such that the fabric 201 does not significantly change the force curve.

Figure 6A:
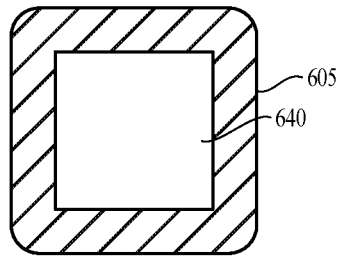
FIGS. 6A-6D illustrate a first example of assembly of an individual key that may be backlit by an illuminator.

FIGS. 6A-6D illustrate a first example of assembly of an individual key 602 that may be backlit by an illuminator. FIG. 6A illustrates a top view of an example keycap 605. In this example, the keycap 605 may be formed of an opaque material and include a window 640 formed of clear, translucent, or other material that allows passage of light; the resulting illumination level of the key 602 corresponding to the amount of light allowed through the utilized material where less opaque materials allow result in brighter illumination and more opaque materials result in dimmer illumination. Forming the keycap 605 of an opaque material with a window 640 may allow for use of a material for the window 640 that may not be suitable for construction of the keycap 605 (insofar as it may otherwise be insufficiently strong or durable) while allowing use of a material for the keycap 605 that is suitable for keycap 605 construction but does not allow the passage of light. As one example, the window 640 may be formed from clear polyurethane and the keycap 605 from opaque polyvinyl chloride. However, in various other implementations the entire keycap 605 may be formed of a clear, translucent, or other material that allows passage of light and may not utilize a window 640.

Figure 6B:
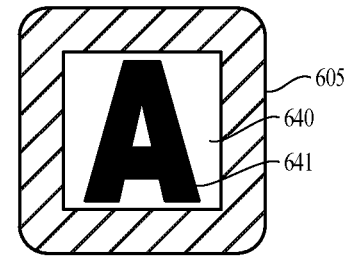
Figure 6C:
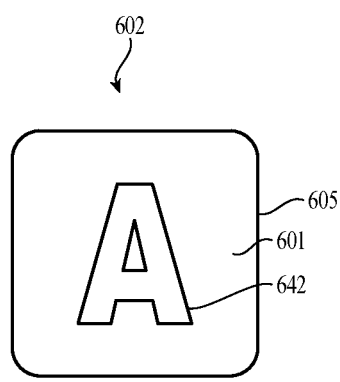

FIG. 6B illustrates the keycap 605 of FIG. 6A after the addition of a legend 641. The legend 641 may be formed of an opaque material, such as black paint, black printing, or other opaque material. FIG. 6C illustrates an assembled key 602 after the surface of the keycap 605 of FIG. 6B is covered with fabric 601 (such as by bonding the fabric 601 to the top of the keycap 605 using adhesive) and a legend 642 is formed on the fabric 601 (such as by printing). The legend 642 may allow the key 602 to be identified even when not backlit or when not sufficiently backlit for the illuminator to be seen (such as when a level of ambient light, like daylight, is high enough that illumination from backlighting is not visible).

Figure 6D:
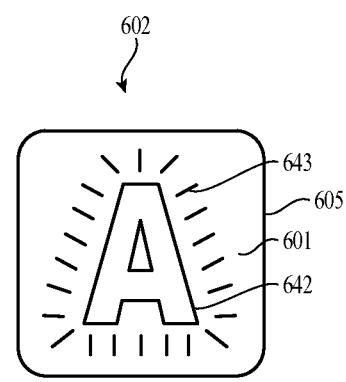

FIG. 6D illustrates the assembled key 602 of FIG. 6C when backlit. As illustrated, light from underneath the key 602 (such as light emitted by an illuminator positioned inside the key) shines out through the fabric 601 (which may allow the passage of light) around the legend 642. As illustrated, the legend 641 and/or the legend 642 may block the passage of light such that the area occupied by the legend 642 is not illuminated.

However, it is understood that this is an example and other configurations are possible without departing from the scope of the present disclosure. For example, in various implementations the legend 641 may be omitted and only the legend 642 may block the passage of light (and/or allow less passage of light than the surrounding fabric 601 such that the legend 642 is illuminated more dimly than the surrounding fabric 601).

By way of another example, in some implementations the legend 641 may be formed by covering the window 640 except for the area occupied by the legend 641 with opaque material (and/or by covering the entire window 640 with the opaque material and then removing, such as by etching, laser etching, and/or other process, the opaque material in the area of the legend 641) such that the legend 642 is illuminated and light is prevented from passing through the fabric 601 in the area around the legend 642. In such an example, the legend 641 may have dimensions larger than that of the legend 642, resulting in an illuminated outline of the legend 642 if the legend 642 does not allow the passage of light or an illuminated legend 642 with a more brightly illuminated outline of the legend 642 if the legend 642 allows less passage of light than the fabric.

Figure 7A:
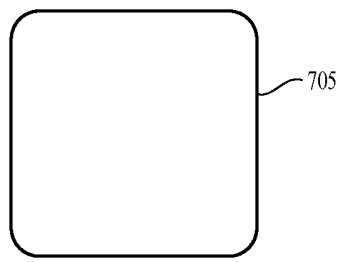
FIGS. 7A-7F illustrate a second example of assembly of an individual key that may be backlit by an illuminator.
Figure 7B:
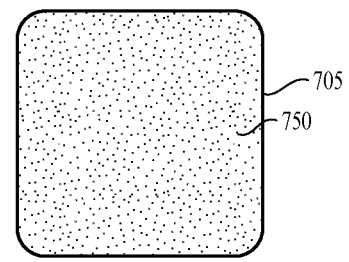
Figure 7C:
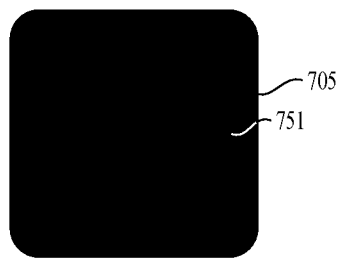
Figure 7D:
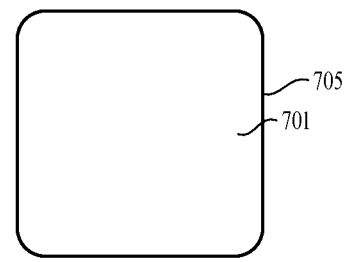
Figure 7E:
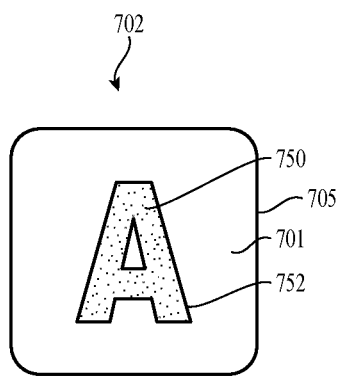

FIGS. 7A-7F illustrates a second example of assembly of an individual key 702 that may be backlit by an illuminator. FIG. 7A illustrates a top view of an example keycap 705. In this example, the keycap 705 may be formed of a clear, translucent, or other material that allows passage of light. FIG. 7B illustrates the keycap 705 of FIG. 7A after the addition of first coating 750. The first coating 750 may be formed of a material that allows the passage of light, such as a white or appropriately colored paint or print. FIG. 7C illustrates the keycap 705 of FIG. 7B after the addition of second coating 751. The second coating 751 may be formed of an opaque material, such as black paint or print. As illustrated, the second coating 751 may entirely cover the first coating 750. FIG. 7D illustrates the keycap 705 of FIG. 7C after the keycap 705 is covered with fabric 701 (such as by bonding the fabric 701 to the top of the keycap 705 using adhesive). FIG. 7E illustrates an assembled key 702 after a portion of the fabric 701 and the second coating 751 are removed (such as by etching, laser etching, and/or other processes) to expose a portion of the first coating 750 to form a legend 752. In implementations where the fabric 701 is bonded to the keycap 705 using adhesive, the adhesive may be reflowed after the portions of the fabric 701 and second coating 751 are removed in order to ensure that the remaining portions of the fabric 701 remain adequately bonded to the keycap 705.

Figure 7F:
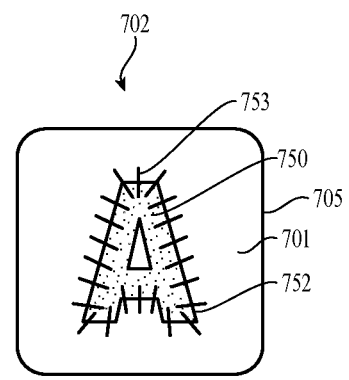

FIG. 7F illustrates the assembled key 702 of FIG. 7E when backlit. As illustrated, light from underneath the key 702 shines out through the first coating 750 in the area of the legend 752, the remaining portions of the second coating 751 and/or the fabric 701 blocking the passage of light such that the area around the legend 752 is not illuminated.

In various implementations, the color and/or opacity of the first coating 750 may be used to tune the illuminated light. For example, less opaque materials may be used for the first coating 750 to cause in brighter illumination whereas more opaque materials may be used to cause dimmer illumination. By of another example, white colored material may be used for the first coating 750 to cause the illumination to appear white whereas a different colored material (such as blue) may be used to cause the illumination to appear another color (such as blue).

However, it is understood that FIGS. 7A-7F are examples and other configurations are possible without departing from the scope of the present disclosure. For example, in various implementations the first coating 750 may be omitted and the second coating 751 may be directly applied to the keycap 705.

Figure 8:
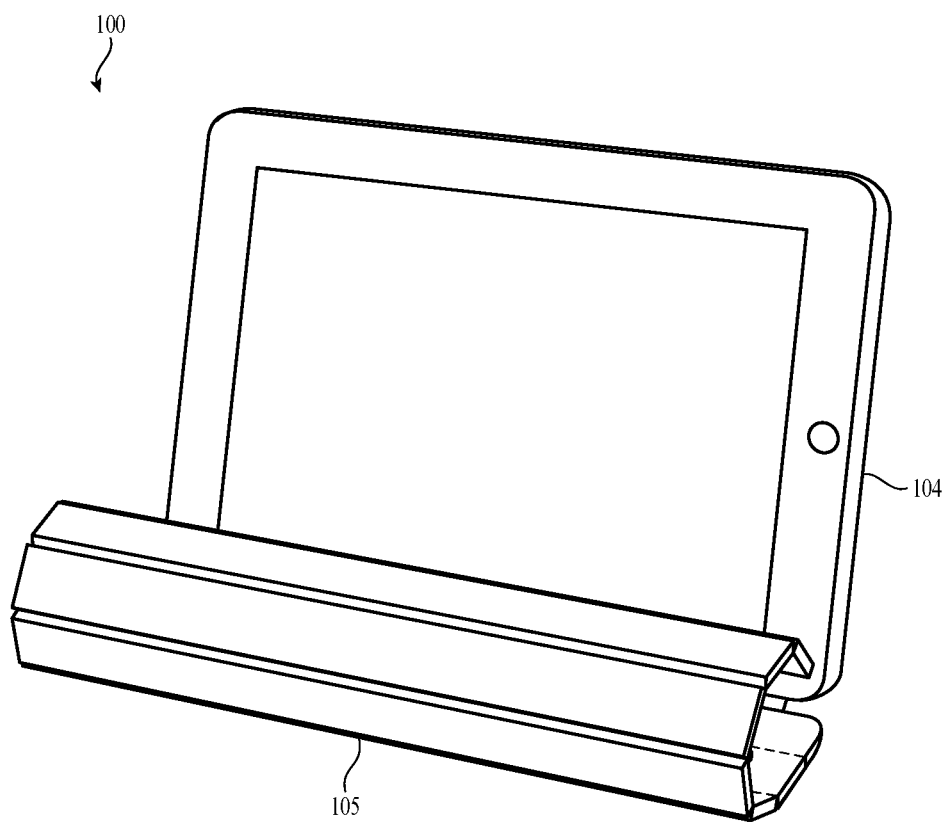
FIG. 8 shows the view of the system of FIG. 1 with the cover rolled up.

FIG. 8 illustrates the sample system 100 of FIG. 1, but with the cover 105 (and flexible keyboard 101) rolled up. The cover 105 and/or portions thereof may be flexible. As illustrated in FIG. 8, the cover 105 may include rigid sections connected by flexible links and the cover 105 may be rolled up and/or otherwise manipulated the rigid sections with respect to each other along the flexible links. Such flexibility in the cover 105 may allow the cover 105 to be rolled up such that the cover 105 can occupy a smaller area when the electronic device 104 is being used without removal of the cover 105.

Further, such flexibility may enable the cover 105 to partially cover the screen instead of entirely covering or uncovering. Portions of the fabric keyboard 101 may be exposed when the cover 105 partially covers the screen. Such exposed portions of the fabric keyboard 101 may be utilized to provide input to the electronic device 104 while the screen is partially covered. Moreover, such flexibility may enable the cover 105 to be rolled or otherwise manipulated to function as a stand and prop the electronic device 104 at an angle on a surface.

The cover 105 may attach to the electronic device 104 in one or more positions where the screen is covered and/or one or more positions where the screen is uncovered. For example, the cover 105 may attach to the electronic device 104 using one or more magnets. In some cases, coupling the magnets may electrically connect contacts of the cover 105 and the electronic device 104 to enable communication between the fabric keyboard 101 and electronic device 104. The fabric keyboard 101 may be disposed on an internal or external surface of the cover 105 and may be utilized to provide input to the electronic device 104 when the cover 105 is not covering the screen.

The illustrated system 100 is but one example system. In various implementations, the fabric keyboard 101 may be incorporated into the electronic device 104 instead of being removably attachable via the cover 105 without departing from the scope of the present disclosure. Further, in various implementations the electronic device 104 may be any kind of electronic device (such as a desktop computing device, a mobile computing device, a tablet computing device, a smart phone, a cellular telephone, a wearable device, a digital media player, and/or any other electronic device).

Moreover, although the fabric keyboard 101 is illustrated and described as being included in the cover 105, the fabric keyboard 101 may be implemented in a variety of different ways. In various implementations, the fabric keyboard 101 may be incorporated into a variety of different items. For example, a case operable to contain, enclose, and/or otherwise hold the electronic device 104 may include the fabric keyboard 101. By way of another example, an item of apparel (such as a jacket, pants, purse, bag, and so on) or other accessory may include a fabric input device with a number of fabric covered buttons (such as five or other numbers of fabric covered buttons) that is operable to wirelessly communicate with an electronic device such as a smart phone stored in a pocket or compartment of (and/or otherwise proximate to) the item of apparel.

Additionally, though the fabric keyboard 101 is illustrated and described as a keyboard, it is understood that this is an example. In various implementations, the fabric keyboard 101 may be any kind of fabric input device (such as a fabric covered button) without departing from the scope of the present disclosure.

Figure 9:
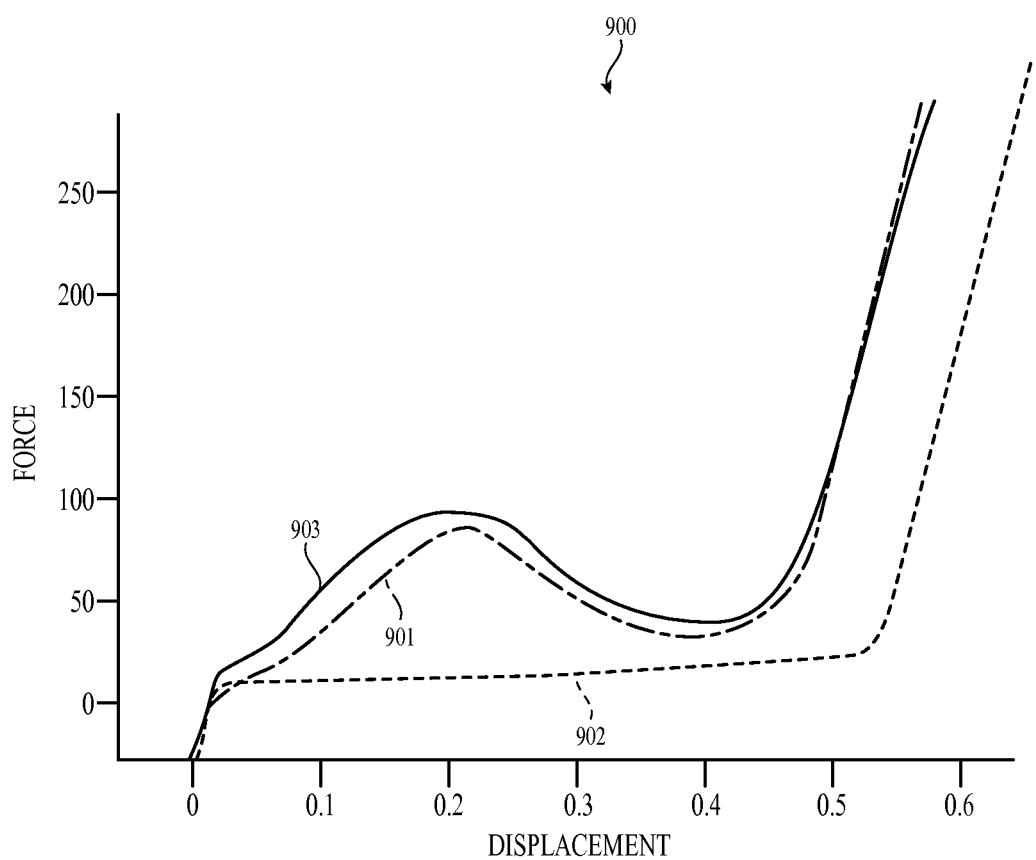
FIG. 9 is a graph illustrating various force and displacement curves for a fabric-covered keycap and certain constituent portions thereof.

FIG. 9 is a graph illustrating: a force and displacement curve 901 for of the dome 210 of the key of FIG. 2; a force and displacement curve 902 for the fabric of the key of FIG. 2; and the resultant force and displacement curve 903 of the combination of the dome 210 and the fabric 201 of the key 102 of FIG. 2. As illustrated, the fabric 201 in this example is configured to operate as a low modulus/constant force spring with a force curve that is relatively low such that the resultant force curve is not significantly different from that of the dome 210 alone.

However, in other implementations the dome 210 may not itself be configured completely with the appropriate force curve. In such an implementation, the fabric 201 may be configured to more significantly change that force curve such that the resultant force curve has the appropriate feel.

The force curve 902 of the fabric 201 may be related to the material(s) used to form the fabric 201 (i.e., the force required to move the fabric), the height and/or other configuration of embossed areas 206 (i.e., the force required to move the embossed structures), and/or other such factors. For example, as discussed above, the fabric 201 may include embossed areas 206 with one or more rounded corners defined by a radius 103. In such examples, the radius 103 may be selected to not significantly alter the force curve and/or to deliberately alter the force curve involved in activating the dome 210. The smaller the radius 103 may cause the embossed area to have more self-supporting stiffness and thus increasingly affect the force curve whereas the larger the radius 103 the less self-supporting stiffness and less effect to the force curve. Alternatively, in examples where it is desired to significantly affect the force curve, non-rounded, pointed corners which may have even more self-supporting stiffness and thus affect the force curve more than rounded corners may be utilized.

Figure 10:
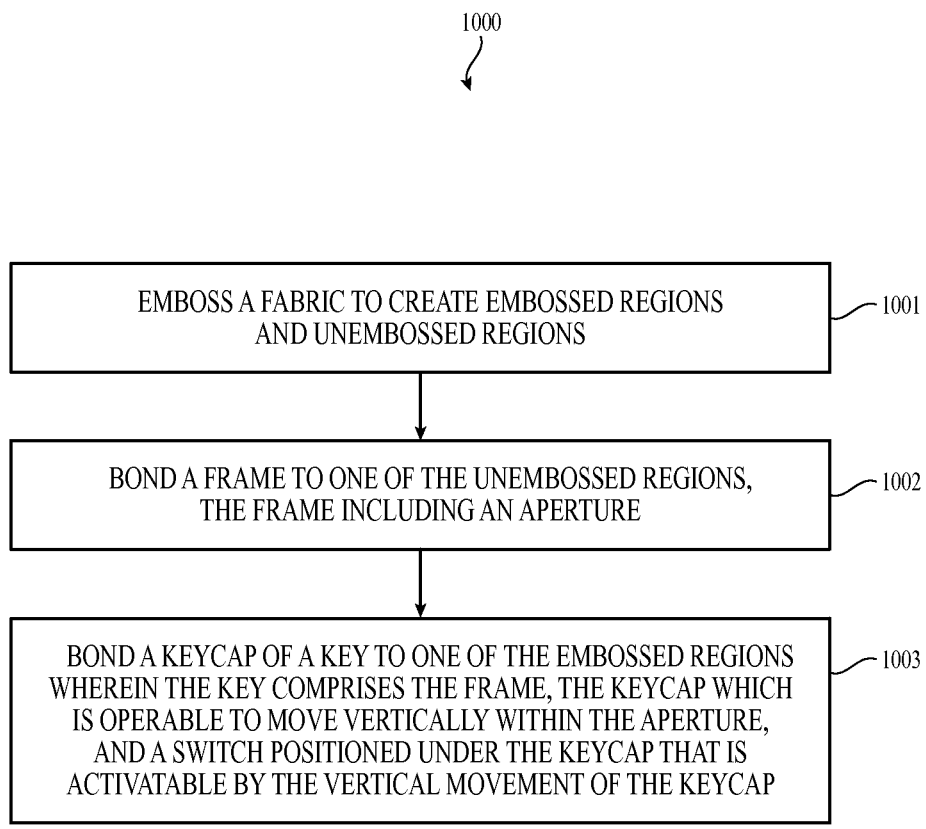
FIG. 10 is a flow chart illustrating one sample method for manufacturing the example fabric keyboard of FIG. 1.

FIG. 10 is a method diagram illustrating a method 1000 for manufacturing an input device. This method may manufacture the fabric keyboard 101 of FIG. 1.

The flow may begin and proceed to block 1001 where a fabric may be embossed to create one or more embossed regions and one or more unembossed regions. The flow may then proceed to block 1002 where a frame is bonded to one of the unembossed regions. Each frame may include an aperture. Next, the flow may proceed to block 1003 where a keycap of a key is bonded to one of the embossed regions. The key may include the frame, the keycap which is operable to move vertically with respect to the frame while at least partially within the aperture, and a switch positioned under the keycap that is activated by the vertical movement of the keycap. The key may be one of a number of keys.

For example, in various embodiments manufacture of an input device may include placing a fabric in a mold. Closing the mold may emboss the fabric to create embossed regions and unembossed regions. Material, such as plastic, may be injected into the mold to create a frame with a number of apertures where the frame is bonded to the unembossed regions of the fabric by the injection molding. Alternately, the embossed fabric may be moved to a second injection mold and material injected therein. Individual keycaps may be placed in the apertures and bonded to the embossed regions of the fabric (which may have been removed from the injection mold), such as using adhesive. It should be understood that this is but one way of making an embossed fabric and related key structure; other methods may be used to emboss fabric and/or bond the fabric to a keycap and/or frame.

However, it is understood that this is an example. In various other implementations, a number of keys each with a respective frame (or respective frame portion of a unified frame that includes multiple apertures), a respective keycap operable to move within an aperture of the respective frame, and a switch positioned under the respective keycap that is activated by vertical movement of the keycap, may be assembled. The fabric may be embossed to create embossed and unembossed regions. The frame of each key may be bonded to an unembossed region and the keycap of each key may be bonded to an embossed region.

Although the method 1000 is illustrated and described above as including particular operations performed in a particular order, it is understood that this is an example. In various implementations, various orders of the same, similar, and/or different operations may be performed without departing from the scope of the present disclosure.

For example, block 1001 illustrates and describes assembly of the keys as a single step. However, in various implementations assembly of the keys may involve a series of operations. For instance, in a first example operation the keycap may be positioned in the aperture and in a second example operation the switch may be positioned under the keycap.

As described above and illustrated in the accompanying figures, the present disclosure describes systems, apparatuses, and methods related to fabric input devices such as fabric keyboards. An input device may include one or more keys that each includes a keycap that is operable to move within an aperture of a frame to activate a switch and fabric disposed over the frame and keycap. A first region of the fabric may be bonded to the keycap and a second region of the fabric may be bonded to the frame. The fabric may dampen sound from within the keyboard and/or emanating through the aperture, such as noise related to movement of the keycap, activation of the switch, and so on. The fabric may also form a barrier that restricts passage of contaminants into the aperture and/or other portions of the input device.

It should be appreciated that a variety of modifications and variations may be made to any structure, portion of a structure, or method described herein. For example, although the key 102 is illustrated and described above as having a top surface formed of the fabric 201, it is understood that this is an example. In some implementations, an element such as a key pad may be placed over the fabric 201. This may provide the appearance of a typical keyboard key while still enabling the use of the fabric 201 for purposes of key 102 operations, sound dampening, contaminant barrier, and so on.

Further, although the key 102 is illustrated and described as directly engaging the keycap 205 and the dome switch, it is understood that this is an example. In various implementations one or more other mechanisms may positioned between the keycap 205 and the dome switch (which may be a switch other than a dome switch) without departing from the scope of the present disclosure. For example, in such implementations the key 102 may include one or more movement mechanisms such as a butterfly mechanism, a scissor mechanism, and/or any other such key movement mechanism. These movement mechanisms may limit the upward and/or downward motion and position of the keycap or key, as well as biasing the key or keycap away from the dome switch (or otherwise toward a surface of the input device) when the key is not under a load. In other embodiments, one or both of the dome switch and fabric may serve to similarly limit keycap/key motion and bias the keycap/key.

Additionally, although the fabric 201 is illustrated and described above as being embossed and not being in tension during movement of the keycap 205, it is understood that this is an example. In various implementations, the fabric 201 may be formed of an elastic material without embossed areas 206 and that stretches to allow movement of the keycap 205, which may stretch in the absence of force applied to the keycap 205 to allow the keycap 205 to project above the frame 204. In some such implementations a material may be used for the fabric 201 such that stretching of the fabric 201 does not cause the keycap 205 to put excessive stress on the dome 210, such as the stretching of the fabric 201 putting stress in excess of that necessary to deform the dome 210 when force is not exerted on the keycap 205 thus causing unintentional activation and/or improper operation of the key 102.

With respect to the present disclosure, the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Manufacture of fabric input devices and/or operation of such fabric input devices described in the present disclosure may utilize a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An input device, comprising:
   a frame defining an aperture and a frame flange extending from the aperture;
   a keycap within the aperture and operable to move with respect to the frame, the keycap comprising a top surface projecting above the aperture and a keycap flange laterally extending from the keycap and operable to contact the frame flange to block movement of the keycap relative to the aperture;
   a switch positioned under the keycap; and
   a fabric disposed over the frame and the keycap and comprising:
      a first region bonded to the top surface of the keycap using adhesive;
      a second region bonded to the frame using adhesive; and
      a set of sidewalls connected to the first region and the second region, the set of sidewalls having a height less than a total distance between the top surface and the keycap flange of the keycap;
   wherein the set of sidewalls extends downward beneath the frame and upward along a side of the keycap when the keycap is not traveling to permit the keycap to travel without stretching the fabric or exerting force on the keycap.

2. The input device of claim 1, wherein
   the fabric further includes a set of embossed regions; and
   the second region is between adjacent embossed regions of the set of embossed regions.

3. The input device of claim 1, wherein the keycap flange is configured to engage an inner surface of the frame flange when the keycap is unactuated.

4. The input device of claim 1, wherein the set of sidewalls surround the keycap.

5. The input device of claim 1, wherein at least one embossed region further comprises a rounded corner connecting the first region with the set of sidewalls.

6. The input device of claim 1, wherein the height of the set of sidewalls corresponds to a travel distance of the keycap.

7. The input device of claim 1, wherein the keycap flange contacts the frame to restrict lateral movement of the keycap with respect to the switch.

8. The input device of claim 1, wherein the switch biases the keycap upwards.

9. The input device of claim 1, further comprising:
   an illuminator positioned under the fabric; wherein
   the fabric allows passage of light from the illuminator.

10. The input device of claim 9, wherein:
    the first region includes a legend; and
    the light from the illuminator illuminates the legend.

11. The input device of claim 1, wherein the fabric is slack during vertical movement of the keycap with respect to the switch.

12. The input device of claim 11, wherein a portion of the fabric restricts passage of a contaminant into the aperture.

13. The input device of claim 1, wherein the fabric further comprises:
    an embossed region including a side wall of the set of sidewalls, the side wall forming a U-shaped depression; and
    an unembossed region adjacent the embossed region;
    wherein the fabric is configured to bias upward the keycap.

14. The input device of claim 13, further comprising an illuminator, wherein light emitted from the illuminator shines through a portion of the keycap and the embossed region.

15. The input device of claim 14, wherein the keycap includes an opaque material that blocks passage of the light.

16. The input device of claim 13, wherein the fabric restricts passage of a contaminant into the aperture.

17. The input device of claim 13, wherein the fabric restricts lateral movement of the keycap with respect to the switch.

18. The input device of claim 1, wherein the set of sidewalls form a depression around the keycap relative to the second region when the keycap is in an undepressed state.

19. The input device of claim 13, wherein the U-shaped depression is formed in a portion of the fabric extending downward beneath the frame and extending upward along a side of the keycap.

* * * * *